Patented Aug. 1, 1933

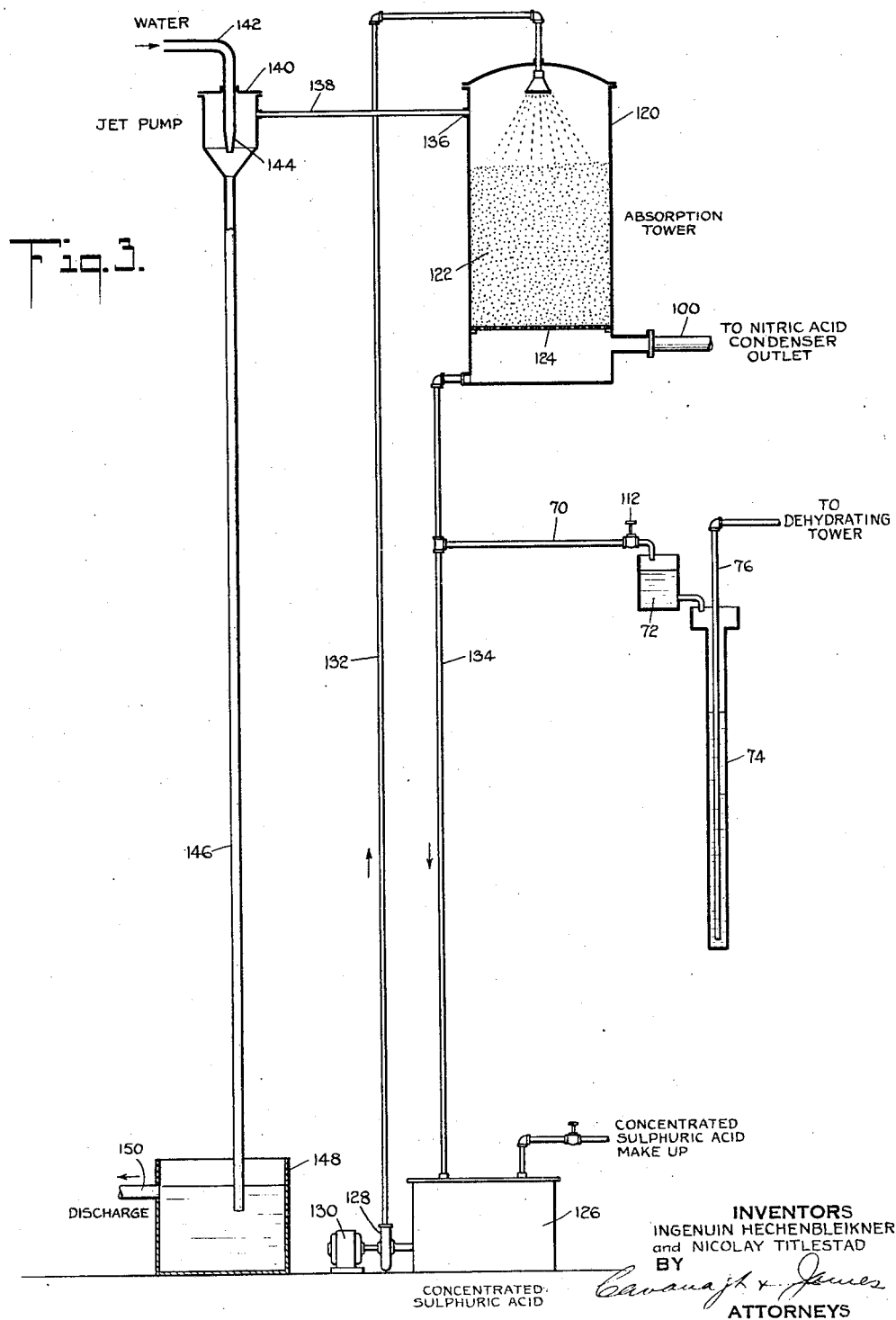

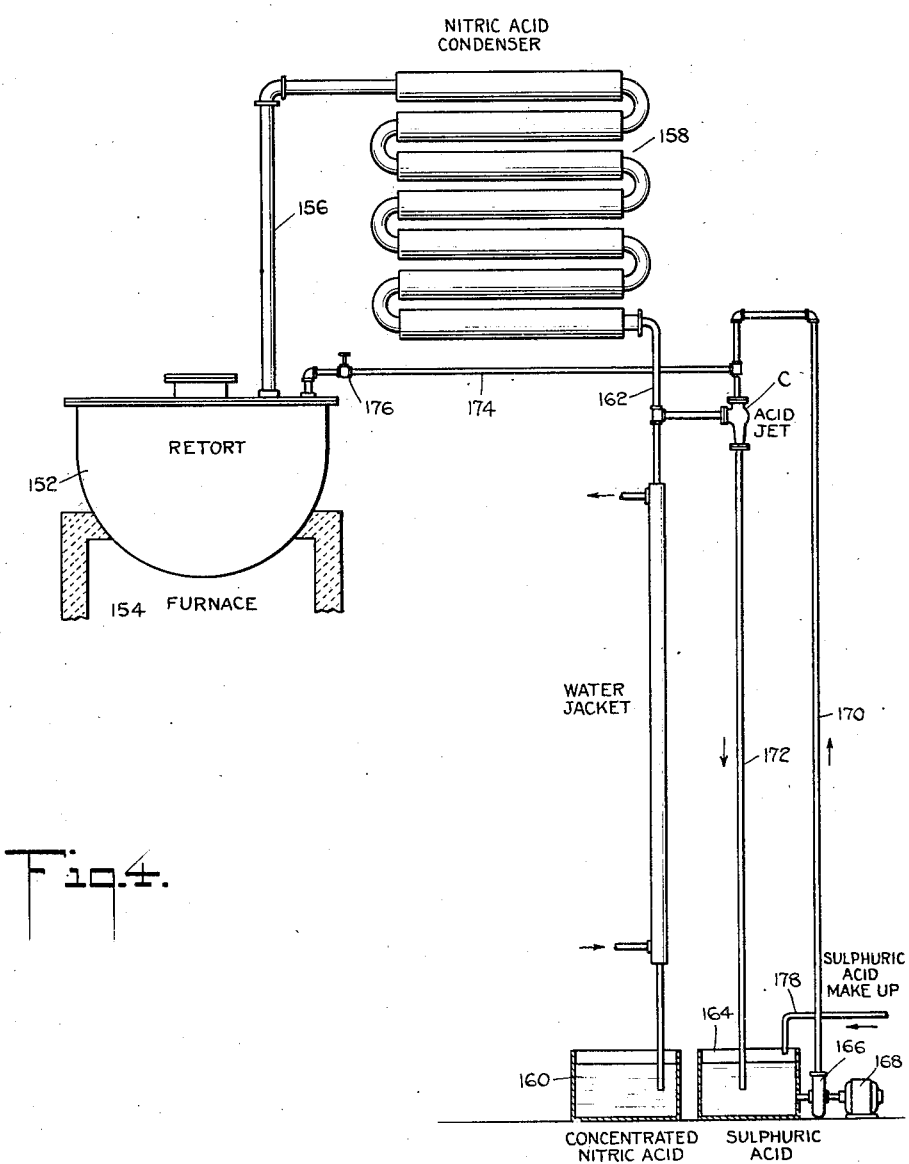

1,920,307

UNITED STATES PATENT OFFICE 1,920,307

METHOD AND APPARATUS FOR THE LIBERATION OR CONCENTRATION OF ACIDS BY HEATING UNDER REDUCED PRESSURE

Ingenuin Hechenbleikner and Nicolay Titlestad, Charlotte, N. C., assignors to Chemical Construction Corporation, Charlotte, N. C., a Corporation of Delaware Application July 24, 1931. Serial No. 552,894

36 Claims. (Cl. 23—160)

This invention relates to a method and apparatus for the liberation or/and concentration of acids by the application of heat under reduced pressure, and more particularly to the liberation and concentration of volatile acids such as nitric acid, necessitating the use of a dehydrating agent such as sulphuric acid.

Known processes and apparatus therefor permit of the liberation of nitric acid gas by the application of heat, as during the manufacture of nitric acid by the retort process. Dilute nitric acid also is concentrated by heating and liberating concentrated nitric acid gas in the presence of a dehydrating agent such as sulphuric acid. One primary object of the present invention is to greatly reduce the heat and temperature necessary for the nitric acid distillation. Another object of the present invention is to greatly reduce the decomposition of the concentrated nitric acid gases into various undesired or less desirable oxides of nitrogen. Both of these objects may, we have found, be fulfilled by operating the entire retort and condenser system under a high vacuum. This high vacuum so greatly reduces the heating temperature needed that ordinary relatively low pressure steam may, if desired, be used to heat the retort or distillation system. At the same time operation under low temperature greatly reduces the decomposition or transformation of nitric acid gas into other oxides of nitrogen. The reduction in heat necessary is in itself an important and direct manufacturing economy.

It has heretofore been suggested to operate a nitric acid concentration system under a very slightly reduced pressure such as may be obtained by the use of a suction blower, and such a suggestion is contained in copending application of Ingenuin Hechenbleikner and Samuel F. Spangler, Serial No. 450,912, filed May 9th, 1930. To operate the system under a very high vacuum was, however, thought undesirable and impossible, first, because of the difficulties attendant upon full condensation of the liberated nitric acid gas, and secondly, because residual nitric acid gas is too valuable commercially to be wasted, and too corrosive to permit the successful operation of machinery for the production of a high vacuum.

Accordingly, another important object of the present invention resides in the provision of a method and means for absorbing and recovering residual or uncondensed fumes or gas leaving the condenser of the system. To fulfill this object we expose such residual fumes to a stream of a liquid which will absorb nitric gases and permit of their recovery, a preferred example of such liquid being concentrated sulphuric acid, although dilute nitric acid may also be employed. As will be described in greater detail subsequently, in either the manufacture or the concentration of nitric acid it may anyway be necessary to supply to the system a make-up of concentrated sulphuric acid, and in such case the absorption of residual gases by concentrated sulphuric acid is particularly desirable, for the nitric acid content is recoverable simply by using the sulphuric acid containing the same as make-up acid for the system. The present aspect of the invention is particularly important in connection with the high vacuum operation previously referred to, first, because there may be a tendency to less perfect condensation under high vacuum, although this in practice is found to be more than offset by the reduction in decomposition to other oxides of nitrogen, and secondly, because it is necessary to eliminate the corrosive gases before they injuriously affect the high vacuum pump if mechanical apparatus is employed. In accordance with another feature of the present invention, therefore, the absorption of nitric fumes is accomplished ahead of or coincident with the high vacuum pump and not following the same.

The difficulties of obtaining the desired high vacuum by mechanical means are almost self-evident, for maintaining an absolute pressure of only several inches of mercury is entirely different from producing a slight suction by means of a blower, and the effects of corrosion become important. Accordingly, another important object of the present invention resides in the provision of a simple, successful and economically operable vacuum pump. A still further and primary object of the present invention is to combine both the vacuum pump and the absorption means for residual nitric fumes. The first object may be fulfilled by using a Venturi or jet vacuum pump at the outlet of the system, and the second object may be simultaneously fulfilled by using for the liquid which is forced through the pump a liquid which will absorb nitric gases and permit their recovery, such as the concentrated sulphuric acid previously mentioned.

To the accomplishment of the foregoing and such other objects as will hereinafter appear, my invention resides in the method steps and apparatus elements and their relation one to the other as hereinafter are more particularly described in the specification and sought to be defined in the claims. The specification is accompanied by drawings in which:

Fig. 3 illustrates separated absorption and vacuum pump apparatus directly applicable to the concentrator of Fig. 2; and Fig. 4 shows the application of the present invention to a retort system utilizable for either the manufacture or concentration of nitric acid.

Figure 1:
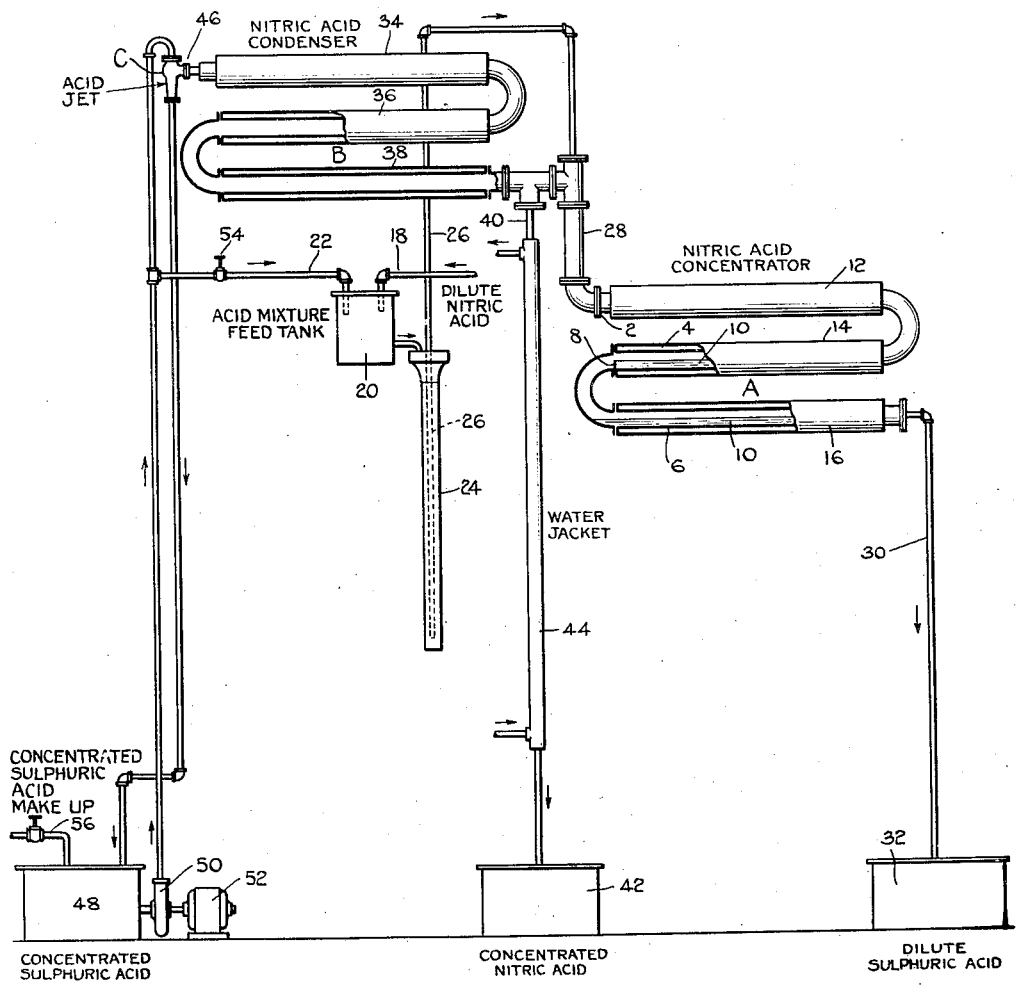
Fig. 1 is a partially sectioned schematic showing of nitric acid concentrating apparatus embodying features of the present invention.

Referring now to the drawings and particularly to Fig. 1 thereof, the nitric acid concentration system shown comprises generally retort means A for the distillation of concentrated nitric acid gas, condenser means B for cooling and liquefying the concentrated nitric acid, and a combined absorption and vacuum pump mechanism C for establishing and maintaining the retort and condenser system under a very high vacuum and for absorbing and permitting the recovery of residual nitric gases leaving the condenser B.

Considering the apparatus in greater detail, the retort system A is preferably of the type described in patent to Ingenuin Hechenbleikner, No. 1,818,711, issued August 11th, 1931, and comprises superposed horizontal pipes 2, 4, 6 connected in series and each provided at its discharge end with a dam 8 for obstructing and retaining in each of the pipes a shallow body of liquid 10. The pipes are individually jacketed by jackets 12, 14, and 16 for the application of a heating medium such as hot oil or, more preferably, steam. The dilute nitric acid to be concentrated is supplied through a pipe 18 to a mixing tank 20 where it is mixed with concentrated sulphuric acid supplied through a pipe 22. The acid mixture is fed to a long vertical pipe or boot 24 providing a liquid vacuum seal, and from the boot 24 is drawn upwardly through a pipe 26, and then flows through pipe 28 into the retort or concentrator system A. Concentrated nitric acid gas is distilled from the mixture in the retort pipes and is readily separated from the mixture because of the high boiling point and the dehydrating action of the sulphuric acid. The diluted sulphuric acid flows downwardly through pipe 30 to a tank 32 from which it may be taken and concentrated for repeated use by known methods.

Concentrated nitric acid gas leaving the retort A flows upwardly through pipe 28 and into condenser B. The latter comprises simply a series of water jacketed pipes 34, 36, 38 connected in series in conventional manner, and serves to chill and liquefy most of the distilled gas. The condensed liquid trickles downwardly through the pipes and then flows from the condenser through a drain pipe 40 leading to concentrated nitric acid tank 42. The pipe 40 is preferably water jacketed, as is indicated by the jacket 44, in order to cool the concentrated nitric acid.

The outlet of condenser B is connected directly to a Venturi or jet pump C by a connection indicated at 46. Any liquid may be forced through the pump in order to provide the desired suction, but the liquid used is preferably one which will readily absorb residual nitric gas from the condenser and permit of recovery of the same. In the present case concentrated sulphuric acid, a supply of which is contained in tank 48, is circulated by a pump 50 driven by a motor 52, and is continuously and rapidly passed through the jet pump C. The concentrated sulphuric acid thus serves the dual function, first, of creating the desired high vacuum in the retort and condenser system, and secondly, of absorbing any residual nitric acid and oxides of nitrogen leaving the condenser B.

Nitric acid is readily recoverable from sulphuric acid, and this recovery may be made independently of the concentration system shown, by occasionally abstracting a portion of the sulphuric acid from tank 48. However, for the sake of simplicity and in view of the fact that concentrated sulphuric acid is anyway mixed with nitric acid in the concentration system, the nitric content of the circulating sulphuric acid is preferably recovered simply by using a portion of the sulphuric acid as make-up acid for the concentration system. Specifically, the supply pipe 22 for concentrated sulphuric acid is connected to either pipe of the circulatory system, as shown, and a valve 54 may be used to bleed the sulphuric acid either continuously or in batches and to supply the same to the mixing tank 20. The make-up of fresh concentrated sulphuric acid, preferably obtained by concentration of the dilute sulphuric acid from tank 32, is supplied to concentrated sulphuric acid tank 48 through a make-up pipe 56.

While the drawing shown in Fig. 1 does not purport to be a scale drawing, it should be particularly noted that the retort A and condenser B are elevated high above ground level and that the supply and drain pipes 26, 30, and 40 are all quite long in order to form a liquid seal against the suction of jet pump C.

Figure 2:
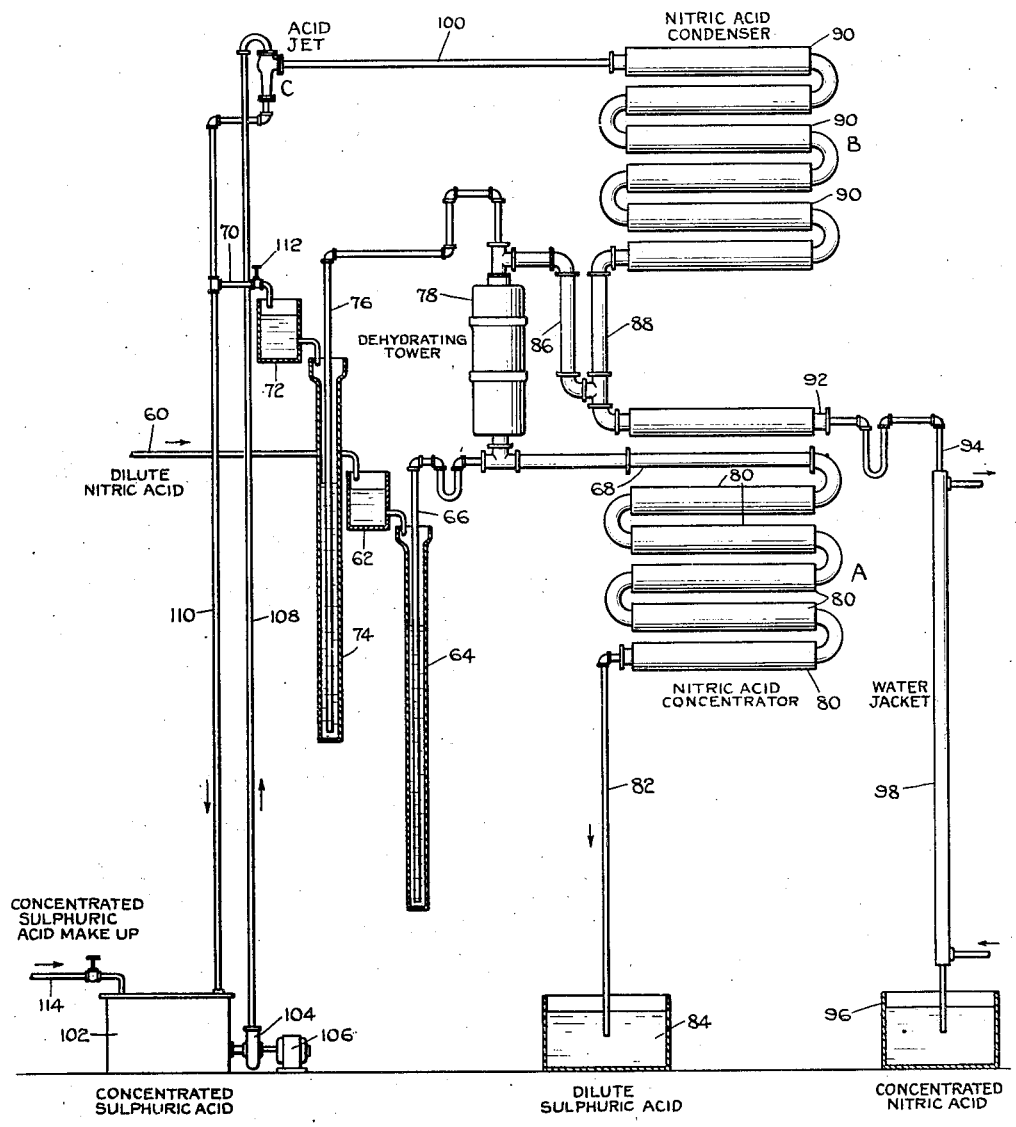
Fig. 2 is a modified form of concentrating apparatus.

Attention is now directed to the nitric acid concentration system disclosed in Fig. 2. This system is much like that previously described in that it comprises retort means A, condenser means B, and absorption and vacuum pump means C. However, the present system differs in some of its details and is particularly intended to illustrate how the features of the present invention may be applied to the efficient and commercially successful concentration system disclosed in copending application of Ingenuin Hechenbleikner and Samuel F. Spangler, Serial No. 450,912, filed May 9th, 1930. The said application has already been referred to as including a fan or blower at the outlet of the condenser. Such a fan or blower creates a suction of only a few inches of water, or at most, say, an inch of mercury. This is in sharp contrast with the vacuum obtainable under the present system in accordance with which the absolute pressure may be brought down to, say, eight inches of mercury or far less, if desired. The retort pipes are steam jacketed in order to heat the same, and the high vacuum operation described herein makes it possible to reduce the necessary steam pressure from 250 or at least 200 pounds per square inch to a value of only 100 or 50 pounds per square inch, as desired, thereby making it possible in many cases to use a steam supply which is anyway available at the plant, instead of installing a special high pressure steam boiler. If the acid mixture supplied to the concentrator comprises, for example, 60% sulphuric acid, 18% nitric acid, and 22% water, the boiling point is 135° C., if the pressure is maintained at 760 mm. of mercury, whereas if the pressure is reduced to 300 mm. of mercury the boiling point is reduced to 105° C. and with the present system a pressure of far less than 300 mm. of mercury is obtainable.

Considering the system of Fig. 2 in detail, the dilute nitric acid to be concentrated is supplied through a pipe 60 to a level tank 62 from which it is fed into a boot 64. It is then drawn upwardly through a riser pipe 66 and led into a mixer tube 68 which, for reasons described in the aforesaid copending application, is preferably unheated. Concentrated sulphuric acid is supplied through a pipe 70 to a level tank 72 from which it is fed into a boot 74. The acid is then drawn upwardly through a supply pipe 76 by which it is led to the top of a compact dehydrating tower 78 through which the sulphuric acid descends and subsequently is mixed with the dilute nitric acid in the mixer tube 68.

The retort system A comprises individually jacketed retort pipes 80 connected in series with one another and with the mixer tube 68. The mixer tube 68 and each of the retort tubes 80 are provided internally with dams, such as the dam 8 in Fig. 1, for obstructing and retaining in each of the tubes a shallow body of liquid while permitting distilled gases to flow upwardly through the top portion of the tubes,—all as is clearly set forth in the aforesaid copending application. The diluted sulphuric acid leaves retort A through a pipe 82 and is collected in a suitable storage tank 84.

The concentrated nitric acid gas distilled from the mixture in retort A flows upwardly through dehydrating tower 78 in counter-current relation to the descending concentrated sulphuric acid, and then flows downwardly through pipe 86 and upwardly through a bleacher pipe 88 the upper end of which is connected directly to condenser B.

The water jacketed pipes 90 of the condenser chill and liquefy the concentrated nitric acid gas, and the liquefied acid flows downwardly through bleacher pipe 88 in counter-current relation to the upwardly rising gas. The liquid then flows through a preferably water jacketed cooler 92 from which it is led downwardly through a drain pipe 94 to any suitable storage tank 96. The pipe 94 may be water jacketed, as is indicated at 98, in order to further cool the concentrated nitric acid.

The outlet from condenser B is connected directly through a pipe 100 to the pump C. This is simply a jet pump acting on the Venturi principle, just as was described in connection with Fig. 1. The liquid for operating the pump preferably consists of cold concentrated sulphuric acid contained in a storage tank 102 and continuously and rapidly circulated by means of a pump 104 driven by a motor 106 upwardly through pipe 108, then through the jet pump C, and downwardly through pipe 110.

As was previously explained, this cold concentrated sulphuric acid serves the dual function, first, of completely absorbing residual nitric gases and permitting of their subsequent recovery, and secondly, of providing the desired high vacuum in the entire concentrator system. The nitric acid content of the circulating liquid may be recovered as a separate process or more preferably is recovered simply by using a portion of the same as make-up acid for the concentrator system. This is readily accomplished by connecting the concentrated sulphuric acid supply pipe 70 to pipe 110 of the circulatory system, as is clearly evident from the drawing. A valve 112 may be used to control the bleeding of nitric-containing sulphuric acid from the circulatory system to the tank 72, and this may, of course, be either continuous or in batches. Fresh concentrated sulphuric acid is supplied through a pipe 114 to tank 102 in order to make up for that used in the concentrator.

Here, as in connection with Fig. 1, it should be understood that the retort and condenser systems A and B are preferably located high above ground level in order to provide ample room for the relatively long supply pipes 66 and 76 and drain pipes 82 and 94 for a barometric seal against the suction of the vacuum pump C. The boots 64 and 74 surrounding the supply pipes 66 and 76 are made of sufficient length and sufficient volumetric capacity to take care, on the one hand, of the acid flowing back into the boots from the pipes should the vacuum be broken, and, on the other hand, to maintain the desired liquid seal around the lower or entrant ends of the pipes should the vacuum be temporarily increased or the supply of acid to the boots temporarily interrupted.

In Figs. 1 and 2 the nitric acid concentration system disclosed is one in which the dilute acid and dehydrating agent are first mixed and subsequently heated in order to distill therefrom the concentrated acid. It should be understood, however, that this concentration process, while a preferred one, is described merely by way of exemplification, and that any concentration system resulting in the distillation of nitric acid by the application of heat may equally well be employed. Many such systems take advantage of the non-volatile and dehydrating properties of sulphuric acid, and in such systems it is general to expose or subject the dilute nitric acid to the action of both heat and a dehydrating agent, the heat being applied to either or both agents in any desired manner. All such systems require far less heat if operated under a high vacuum as herein set forth. The lower heating temperature utilizable results in less decomposition into oxides. The absorption of residual gas in every case will prevent pollution and contamination of the air and waste of the relatively highly expensive nitric acid gas. The nitric-containing sulphuric acid forced through the jet pump may in each case be used as make-up acid for dehydrating dilute nitric acid in the main process. It should further be understood that the concentration systems and the present improvement applied thereto are applicable not only to nitric acid, but also to other acids similarly characterized by a relatively low boiling point and consequent volatility.

As so far described the absorptive and evacuating stages of the process have been combined and made coincident, and it is in this form that the invention is preferably practiced. However, it is perfectly possible both theoretically and practically to separate the absorption and evacuation stages, and apparatus illustrative of this is set forth in Fig. 3 of the drawings. To most readily understand the drawings, it has been made directly applicable to the concentration system shown and described in connection with Fig. 2, and it is merely necessary to suppose the pipe 100 in Fig. 3 to be a continuation of the pipe 100 in Fig. 2 leading directly to the outlet from the condenser B, and the sulphuric acid supply pipe 76 in Fig. 3 corresponds to the similarly numbered pipe in Fig. 2 which leads to the top of the dehydrating tower and thence to the mixer tube and the retort pipes.

Referring now to Fig. 3, the residual or uncondensed gases from the condenser B flow through pipe 100 and then upwardly through a closed absorption tower 120. This tower contains preferably loose packing material 122 supported upon a perforated disc 124 in conventional manner. A supply of an absorptive medium or liquid which will absorb nitric fumes and make possible their recovery is contained in tank 126. This liquid is preferably cold concentrated sulphuric acid, but may, for example, be dilute nitric acid. The concentrated sulphuric acid is preferred not only because of its high absorptive power and the facility with which the nitric content may be recovered, but also because of its low volatility. For example, a 66° Baumé acid has a boiling point of 260° F. even at a nearly perfect vacuum of, say, 29.8 inches of mercury. The sulphuric acid, therefore, has no tendency to volatilize and flow into the vacuum pump. Furthermore, it is relatively cheap and is valued at only a small fraction of the price of nitric acid.

The concentrated sulphuric acid in tank 126 is circulated by means of a pump 138 driven by a motor 130 upwardly through pipe 132, whence it is sprayed downwardly through tower 120 and returns through pipe 134 to tank 126.

The tower 120 and the sulphuric acid circulatory system are entirely closed except for a main outlet 136 which is directly connected through a pipe 138 to a vacuum pump 140. This pump may be of any desired type and may be mechanical rather than hydraulic as here illustrated. The obstacle heretofore existent to the use of a mechanical pump was the presence of highly corrosive nitric acid fumes. A light suction fan or blower may be operated in spite of such fumes, but an efficient high vacuum pump cannot. With the present arrangement it is evident that the corrosive fumes have been completely absorbed before they can reach the pump 140, and the latter may therefore, if desired, be a mechanical pump.

However, for the sake of simplicity and dependability, we prefer even in this case to use a Venturi or jet jump, but it is now possible to use any desired liquid medium to operate the pump, and, of course, the most satisfactory liquid in such case is water. The water is supplied through a pipe 142 and flows through a jet 144, and this creates a suction in known manner which is applied to the absorption tower 120 and the condenser and retort pipes B and A through interconnecting pipe 100. The pump discharge flows downwardly through a pipe 146 into a water seal drain tank 148 from which it is discharged through a drain pipe 150.

Because concentrated sulphuric acid is used for the absorptive medium, the nitric content thereof may be recovered simply by using a portion of the same as make-up acid for the concentrator, and this is accomplished by bleeding the same through pipe 70, valve 112, tank 72, boot 74, and supply pipe 76, just as was described in connection with Fig. 2.

In order to illustrate the fact that the present invention is broadly applicable to any process in which nitric acid gas is liberated by the application of heat, the invention is illustrated in Fig. 4 as applied to the retort process for manufacturing nitric acid. In this process sodium nitrate and concentrated sulphuric acid are placed in a retort 152 which is heated in any desired manner, as by a furnace 154, whereupon the salt and acid react with a liberation of nitric acid gas,—all in accordance with well known prior art practice. The gas is supplied through a pipe 156 to a condenser 158 which chills and liquefies the nitric acid gas, the liquid flowing downwardly through the condenser and being collected in any suitable storage tank 160 through a drain pipe 162. In accordance with the practice of the prior art the residual gases were next led to a series of, say, four or more exceedingly large hypo-nitric towers through which water was trickled in series, the water being pumped to the top of one tower from the bottom of the next in counter-current relation to the flow of nitric gases. By the installation of exceedingly bulky and expensive equipment, it was possible to obtain a very dilute nitric acid in this manner, the concentrated acid being only that collected directly from the condenser.

In accordance with the present invention it is merely necessary to apply to the outlet of the condenser the small and compact acid jet C. In its absorption function the acid jet dispenses with the numerous large towers and auxiliary equipment heretofore needed, and at the same time insures perfect instead of only partial absorption of the residual gases. However, in addition thereto the jet operates in its evacuating function and thereby places the retort 152 under any desired degree of vacuum, which in turn reduces the heat and temperature needed to promote the chemical reaction and liberate the desired nitric acid gas. The absorptive medium, preferably concentrated sulphuric acid, is contained in tank 164 and is continuously and rapidly circulated by a pump 166 driven by a motor 168, upwardly through pipe 170, then through the Venturi or jet pump C, and back to tank 164 through pipe 172. The nitric content of the circulating acid may be recovered simply by using a portion of the same as the concentrated sulphuric acid placed in the retort for reaction with the nitrate of soda. For this purpose a bleed pipe 174 and valve 176 are provided. The operation is, of course, preferably carried on in batches. The thus used acid is made up by a supply of make-up acid to tank 164 through pipe 178.

It will be evident from the foregoing description that the necessary apparatus is made exceedingly compact, simple, and inexpensive compared with that needed heretofore. It will further be understood that the product obtained is entirely concentrated nitric acid which, of course, is valuable commercially. It will further be appreciated that the apparatus set forth is quite analogous to that previously described, in that the retort 152 corresponds to the steam jacketed retort system A in Figs. 1 and 2, while the condenser pipes 158 correspond to the condenser B in Figs. 1 and 2, and, of course, the acid jet pump C corresponds to the similar pump C in Figs. 1 and 2.

The apparatus shown in Fig. 4 may be used for the concentration of nitric acid as well as for the manufacture of the same. For this purpose dilute nitric acid and concentrated sulphuric acid are placed in retort 152, preferably in batches. Upon heating, concentrated nitric acid gas is distilled from the mixture and flows into the condenser. The operation may be carried out just as was previously described, and of course the nitric acid-bearing sulphuric acid in the circulatory system may be used as the make-up acid for dehydrating the dilute nitric acid.

It probably need hardly be explained that the separation of the absorption and evacuation functions, as described in Fig. 3, may be applied to the invention in any of its applications, that is, it may be applied to the concentration system of Fig. 1 as well as to the concentration system of Fig. 2, and may be applied to the nitric acid manufacturing or/and concentration system of Fig. 4.

It may be pointed out that while we have shown the circulatory system for the sulphuric acid jet combined with the sulphuric acid make-up for the apparatus, this is not necessarily the case, for separate systems of sulphuric acid may be employed. This is particularly true in view of the fact that sulphuric acid containing a small quantity of nitric acid is itself a commercially valuable and marketable product and frequently, particularly in winter, small quantities of nitric acid are added to sulphuric acid before shipment in order to prevent freezing. It should also be understood that liquid suitable for absorbing residual nitric fumes is not necessarily suitable for recovery of the same. For example, by running water through the jet pump it is possible to obtain the desired vacuum and to absorb and remove the residual nitric fumes, but the nitric acid content is too low to be commercially valuable and the residual nitric acid is therefore lost. By continuous and prolonged circulation of a small quantity of water, even this method could be used, giving dilute acid.

The suction of the jet is due slightly to absorption of nitric vapor by the sulphuric acid, but is almost wholly due to Venturi action, for the quantity of residual vapor is relatively small. It is interesting to observe, however, that even the presence of the residual vapor helps make the process economical by improving the suction of the pump.

In general, it should be understood that the system being under vacuum, no feed, discharge, or bleed pipes should be so connected that they will tend to break the desired vacuum. The foot or discharge end of all discharge or drain pipes should be immersed in a tank or body of the liquid to seal the said pipes. Bleed pipes should also be sealed, as by U bends, or optionally, precaution may be taken to connect the same to feed pipes rather than drain pipes, the former being constantly filled under positive pressure. Thus, in Fig. 1 the bleed pipe 22 is connected to the pressure feed pipe of jet pump C. In Figs. 2 and 3 the bleed pipes 70 may and preferably are likewise connected to the pressure feed pipes 108 and 132, but if connected as shown, to the discharge pipes 110 and 134, a seal should be provided to prevent the vacuum from being broken when the valve 112 is opened.

It is believed that the method of the present invention, the apparatus for practicing the same, and the many advantages thereof, will, for the most part, be apparent from the foregoing description. Any process that liberates nitric acid gas under the influence of heat requires less heat when run under a vacuum. This in turn reduces the decomposition of the acid into other oxides of nitrogen. The reduction in heat is not only economical, but makes possible the utilization of relatively low pressure steam or other anyway available heating medium, and frequently dispenses with the necessity of a special high pressure boiler. All residual nitric gas which is not condensed is fully absorbed and completely recovered. The high vacuum is obtainable by a jet pump of simplest possible form. The evacuation and absorption functions may be combined into a single simple jet pump by using a suitable liquid such as concentrated sulphuric acid for operating the jet. The absorption and evacuation functions may be separated, in which case any preferred form of vacuum pump may be used without fear of corrosion. The process and apparatus of the invention are applicable to numerous processes for the concentration or/and manufacture of nitric acid, and to the denitration of spent acid. They are further applicable to the concentration or/and manufacture of other acids which raise the same problems because of volatility, and to the separation of mixtures of liquids of different volatility, such as solutions of alcohols in acids. In such case an appropriate circulating liquid different from that already mentioned would, of course, be selected.

It will be apparent that while we have shown and described our invention in preferred forms, many changes and modifications may be made in the method and structures disclosed, without departing from the spirit of the invention, defined in the following claims.

We claim:

1. In processes including the liberation of vapors of nitric acid under the application of heat, the method of reducing the necessary heat, which includes operating the system under a vacuum created on the Venturi principle by running a liquid medium past the outlet of the system.

2. Apparatus for the liberation of vapors of nitric acid under the application of heat, comprising retort means, heating means therefor, and a Venturi or jet vacuum pump at the outlet of the system.

3. In processes including the liberation of vapors of nitric acid under the application of heat, the method which includes operating the system under a vacuum created on the Venturi principle by running a liquid which will absorb nitric gases and permit their recovery past the outlet of the system.

4. Apparatus for the liberation of vapors of nitric acid under the application of heat, comprising retort means, heating means therefor, a Venturi or jet vacuum pump, and means to pass through said pump a stream of a liquid which will absorb nitric gases and permit their recovery.

5. In processes including the liberation of vapors of nitric acid under the application of heat, the method which includes operating the system under a high vacuum created on the Venturi principle by running a stream of concentrated sulphuric acid past the outlet of the system.

6. Apparatus for the liberation of vapors of nitric acid under the application of heat, comprising retort means, heating means therefor, a Venturi or jet vacuum pump, and means to circulate through said pump a stream of concentrated sulphuric acid.

7. Apparatus for the liberation of an acid gas under the application of heat, comprising retort means, heating means therefor, a condenser connected with the retort means for liquefying the evolved gas, and a Venturi or jet pump connected to the outlet of the system.

8. In processes including the liberation of nitric acid gas under the application of heat and the condensation of the liberated nitric acid gas by cooling, the method which includes operating the retort and condenser system under a high vacuum created on the Venturi principle by running a liquid past the outlet of the system, and using for the running liquid a liquid which will absorb nitric gases and permit their recovery.

9. Apparatus for liberating nitric acid gas under the application of heat and for recovering the same, comprising retort means, heating means therefor, a condenser for liquefying the nitric acid gas, a Venturi or jet vacuum pump at the outlet of the condenser, and means to force through said pump a liquid which will absorb nitric gases and permit their recovery.

10. In processes including the liberation of nitric acid gas under the application of heat and the condensation of the liberated nitric acid gas by cooling, the method of reducing the necessary heat and the decomposition of nitric acid into oxides of nitrogen, which includes operating the retort and condenser system under a high vacuum created on the Venturi principle by running a liquid past the outlet of the system, and simultaneously absorbing and making possible the recovery of residual fumes of nitric acid and of oxides of nitrogen by using for the running liquid concentrated sulphuric acid.

11. Apparatus for liberating nitric acid gas under the application of heat and for recovering the same, comprising retort means, heating means therefor, a condenser for liquefying the nitric acid gas, a Venturi or jet vacuum pump at the outlet of the condenser for maintaining the retort and condenser system under a high vacuum in order to reduce the necessary heat and the decomposition of nitric acid into oxides of nitrogen, and means to circulate through said pump a stream of concentrated sulphuric acid in order to absorb and make possible the recovery of residual fumes of nitric acid and oxides of nitrogen.

12. The method of concentrating dilute nitric acid, which includes subjecting the dilute acid to heat and to a dehydrating agent in order to obtain concentrated nitric acid gases, condensing the gases, and establishing a vacuum within the system and at the same time recovering residual nitric gases by running past the outlet of the system a jet of a liquid which will absorb nitric gases and permit their recovery.

13. Apparatus for concentrating dilute nitric acid, comprising means to expose the dilute acid to heat and to a dehydrating agent in order to obtain therefrom concentrated nitric acid gases, condenser means to liquefy the concentrated acid, a Venturi or jet vacuum pump connected to the condenser, and means to force through said pump a liquid which will absorb nitric gases and permit their recovery.

14. The method of concentrating a dilute acid, which includes subjecting the dilute acid to heat and to sulphuric acid in order to obtain the desired concentrated acid gases, condensing the gases, and establishing a vacuum within the system and at the same time recovering residual acid gases by running past the outlet of the system a stream of concentrated sulphuric acid.

15. Apparatus for concentrating dilute nitric acid, comprising means to expose the dilute acid to heat and to concentrated sulphuric acid in order to obtain therefrom concentrated nitric acid gases, condenser means to liquefy the concentrated acid, a Venturi or jet vacuum pump connected to the outlet of the condenser, and means to circulate through said pump a stream of concentrated sulphuric acid.

16. The method of concentrating dilute nitric acid, which includes mixing the dilute acid with concentrated sulphuric acid, heating the mixture to obtain concentrated nitric acid gases, condensing the gases, and establishing a high vacuum within the system and at the same time recovering residual nitric gases by running a stream of concentrated sulphuric acid past the outlet of the system.

17. Apparatus for concentrating dilute nitric acid, comprising means to mix dilute acid with concentrated sulphuric acid, means to heat the mixture to obtain therefrom concentrated nitric acid gases, condenser means to liquefy the concentrated acid, a Venturi or jet vacuum pump connected to the condenser, and means to force through said pump a stream of concentrated sulphuric acid.

18. The method of concentrating dilute nitric acid, which includes mixing the dilute acid with concentrated sulphuric acid, heating the mixture to obtain concentrated nitric acid gases, condensing the gases, establishing a high vacuum within the system and at the same time recovering residual nitric gases by continuously and rapidly circulating concentrated sulphuric acid past the outlet of the system, and using the resulting nitric-containing concentrated sulphuric acid for the acid mixture.

19. Apparatus for concentrating dilute nitric acid, comprising means to mix dilute acid with concentrated sulphuric acid, means to heat the mixture to obtain therefrom concentrated nitric acid gases, condenser means to liquefy the concentrated acid, a Venturi or jet vacuum pump connected to the condenser, means to circulate through said pump a stream of concentrated sulphuric acid, and means for transferring nitric-containing concentrated sulphuric acid from the aforesaid circulatory system to the mixing means in order to mix the same with the dilute nitric acid to be concentrated.

20. In processes including the liberation of nitric acid gas under the application of heat and the condensation of the liberated nitric acid gas, the method of removing and recovering residual nitric acid fumes, which includes exposing said fumes from the condenser to a stream of concentrated sulphuric acid.

21. Apparatus for the liberation of nitric acid gas under the application of heat and for recovering the same, comprising retort means, heating means therefor, condenser means for liquefying the gases, and means to remove and recover residual nitric acid fumes from the condenser by exposing the same to a stream of concentrated sulphuric acid.

22. The method of concentrating dilute nitric acid and of recovering residual nitric acid fumes, which includes subjecting the dilute nitric acid to heat and to a dehydrating agent in order to obtain concentrated nitric gases, condensing the gases, and removing and recovering residual nitric fumes by exposing the same to a stream of concentrated sulphuric acid.

23. Apparatus for concentrating dilute nitric acid, comprising means to expose the dilute acid to heat and to a dehydrating agent in order to obtain concentrated nitric acid gases, condenser means for liquefying the gases, and means to remove and recover residual nitric acid fumes from the condenser by exposing the same to a stream of concentrated sulphuric acid.

24. The method of concentrating dilute nitric acid, which includes mixing dilute nitric acid with concentrated sulphuric acid, heating the mixture to obtain concentrated nitric gases, condensing the gases, removing and recovering residual nitric fumes by exposing the same to a stream of cold concentrated sulphuric acid, and utilizing a portion of the nitric-containing concentrated sulphuric acid as make-up acid for the concentrator mixture.

25. Apparatus for concentrating dilute nitric acid, comprising means to mix the dilute acid with concentrated sulphuric acid, means to heat the mixture in order to obtain concentrated nitric acid gases, condenser means for liquefying the gases, a suppy tank of concentrated sulphuric acid, means to circulate the same, means to remove and recover residual nitric fumes from the condenser by exposing the same to the circulating stream of sulphuric acid, and means for transferring the nitric-containing concentrated acid from the aforesaid circulatory system to the mixing means for mixing the same with the dilute nitric acid to be concentrated.

26. The method of concentrating a dilute acid, which includes subjecting the dilute acid to heat and to a dehydrating agent in order to obtain concentrated acid gases, condensing the gases, and establishing a high vacuum in the system on the Venturi principle by running a liquid past the outlet from the system.

27. Apparatus for the concentration of a dilute acid comprising means for exposing the dilute acid to heat and to a dehydrating agent in order to obtain concentrated acid gases, a condenser for liquefying the gases, and a Venturi or jet pump connected to the condenser in order to establish and maintain a very high vacuum in the system.

28. The method of concentrating dilute nitric acid, which includes mixing dilute nitric acid with a dehydrating agent, heating the mixture to obtain concentrated nitric acid gases, condensing the gases, removing and recovering residual nitric fumes from the condenser by means of a running stream of liquid, and establishing a high vacuum in the system on the Venturi principle by means of a running stream of liquid.

29. Apparatus for the concentration of dilute nitric acid, comprising means for mixing the dilute nitric acid with a dehydrating agent, means to heat the mixture to obtain concentrated nitric acid gases, a condenser for liquefying the gases, an enclosed absorption tower to remove and recover residual nitric fumes from the condenser, and a Venturi or jet pump for establishing and maintaining a high vacuum in the system.

30. In processes including the liberation of vapors of nitric acid under the application of heat, and the condensation of the nitric gases by cooling, the method which includes operating the retort and condenser system under a high vacuum in order to greatly reduce the necessary heat and the decomposition of nitric acid into oxides of nitrogen, but recovering fumes of nitric acid and of oxides of nitrogen from the condenser before the same reach the means creating the desired high vacuum within the system.

31. Apparatus for the liberation of nitric acid gas under the application of heat and for recovering the same, comprising retort means, heating means therefor, a condenser for recovering the nitric acid, absorber means following the condenser for exposing residual fumes of nitric acid and of oxides of nitrogen to a liquid medium which absorbs the nitric gases and permits of their recovery, and means following the last-mentioned means to establish and maintain a high vacuum in the system in order to greatly reduce the necessary heat and the decomposition of nitric acid into oxides of nitrogen.

32. In processes including the liberation of nitric acid gas under the application of heat and the condensation of the nitric gases by cooling, the method which includes removing and recovering residual nitric acid fumes by exposing the same to a stream of concentrated sulphuric acid, and establishing a high vacuum in the system and evacuating the system after the removal of the nitric acid fumes.

33. Apparatus for liberating nitric acid gas, under heat, comprising retort means, means to heat the same, a condenser for liquefying the gases, means to expose residual nitric acid fumes from the condenser to a stream of cold concentrated sulphuric acid in order to absorb and recover the same, and a vacuum pump connected to the outlet of the system after the absorption means.

34. The method of concentrating dilute nitric acid, which includes mixing dilute nitric acid with concentrated sulphuric acid, heating the mixture to obtain concentrated nitric gases, condensing the gases, removing and recovering residual nitric fumes by exposing the same to a stream of cold concentrated sulphuric acid, utilizing a portion of the nitric-containing concentrated sulphuric acid as make-up acid for the concentrator mixture, and establishing a vacuum in the system on the Venturi principle by running a stream of liquid past the outlet from the system.

35. Apparatus for concentrating dilute nitric acid, comprising means to expose the dilute nitric acid to heat and to concentrated sulphuric acid in order to obtain concentrated nitric acid gases, a condenser for liquefying the gases, means to expose residual fumes from the condenser to a stream of concentrated sulphuric acid in order to remove and recover the same, and a Venturi or jet pump connected to the outlet of the system for establishing a high vacuum in the same.

36. Apparatus for concentrating dilute nitric acid, comprising means to mix the dilute nitric acid with concentrated sulphuric acid, means to heat the mixture to obtain concentrated nitric gases, a condenser for liquefying the gases, a supply tank of concentrated sulphuric acid, means to circulate the same, means to expose residual nitric acid fumes from the condenser to the circulating acid in order to remove and recover the fumes, means for transferring nitric-containing concentrated sulphuric acid from the aforesaid circulatory system to the mixing means for mixture with the dilute nitric acid to be concentrated, and a Venturi or jet pump connected to the outlet of the system for establishing and maintaining a high vacuum in the system.

INGENUIN HECHENBLEIKNER.
NICOLAY TITLESTAD.